UNITED STATES PATENT OFFICE.

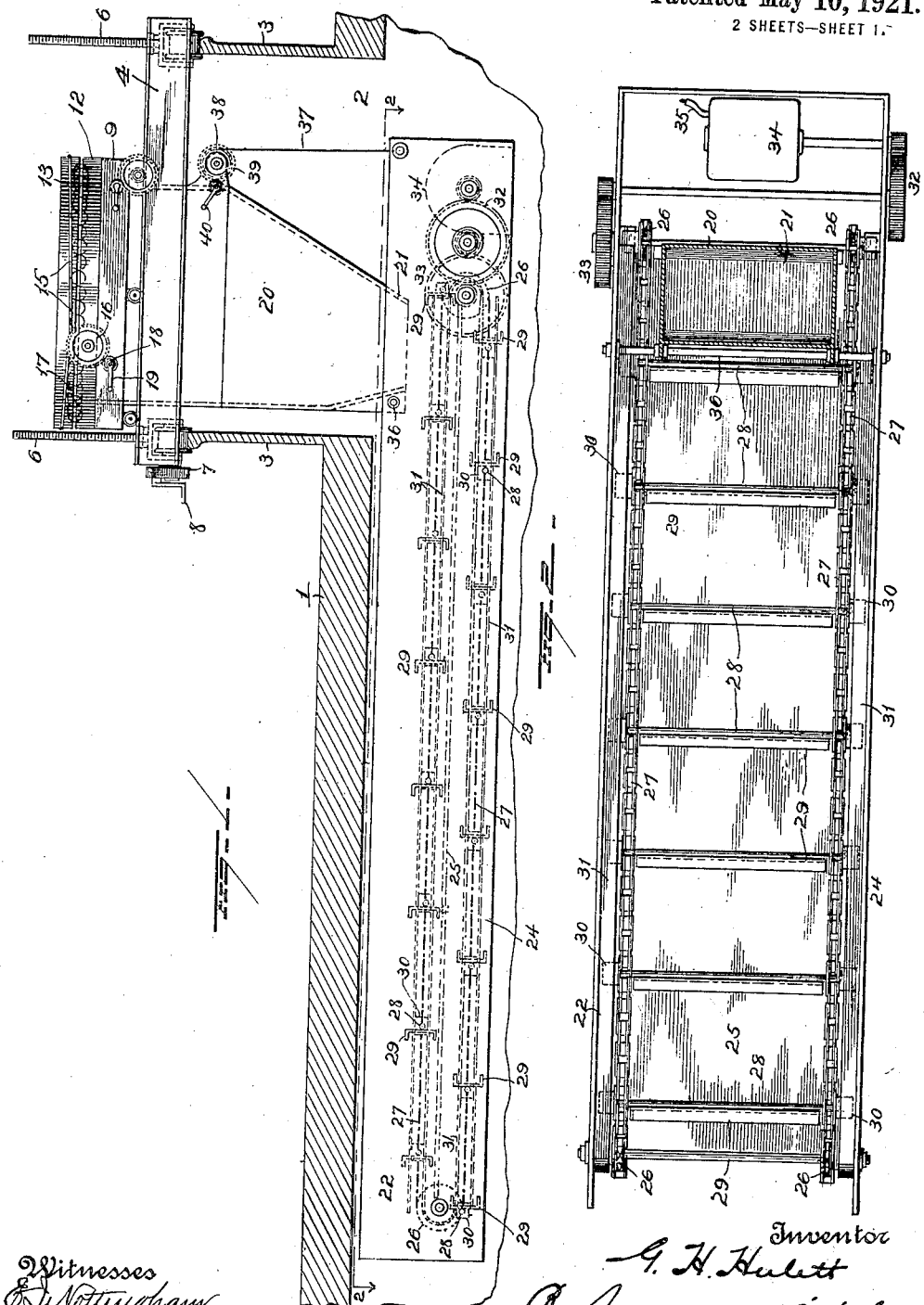

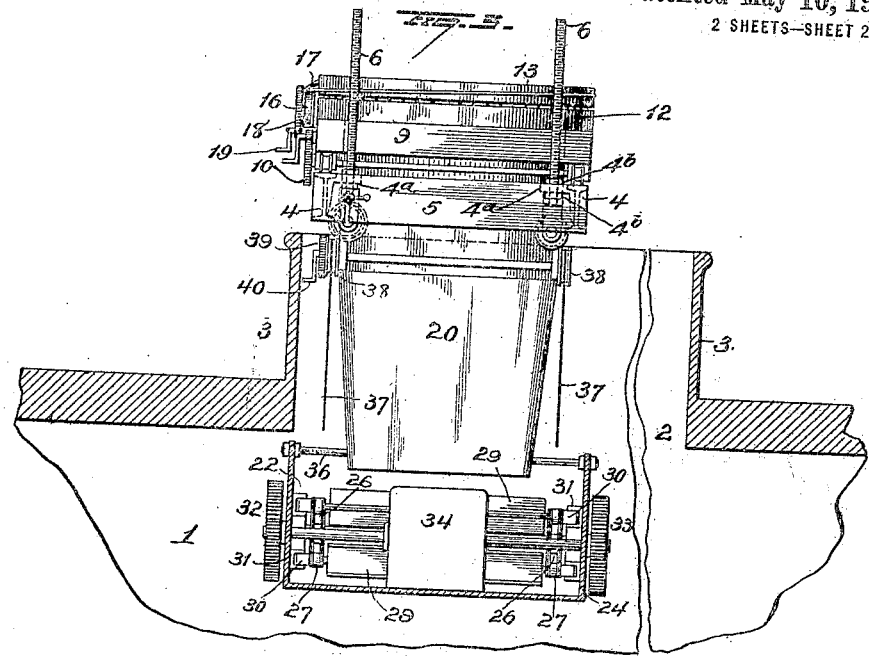
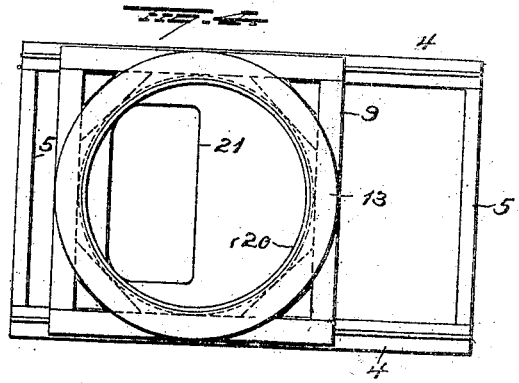
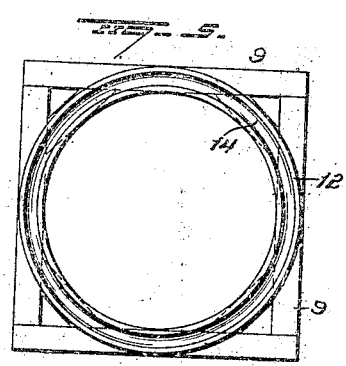
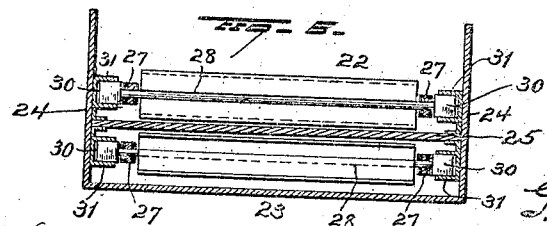

GEORGE H. HULETT, OF CLEVELAND, OHIO.

TRIMMING MECHANISM.

1,377,686.  Specification of Letters Patent.  Patented May 10, 1921.

Application filed February 15, 1919. Serial No. 277,257.

*To all whom it may concern:*

Be it known that I, GEORGE H. HULETT, a citizen of the United States, and a resident of Cleveland, in the county of Cuyahoga and State of Ohio, have invented certain new and useful Improvements in Trimming Mechanism; and I do hereby declare the following to be a full, clear, and exact description of the invention, such as will enable others skilled in the art to which it appertains to make and use the same.

This invention relates to improvements in trimming mechanism and more particularly to such as are adapted for use in trimming cargoes, such as coal, in ships, one object of the invention being to provide simple apparatus which may be mounted on and removed from a ship, and which shall be adjustable for different ships and capable of effectually distributing coal or other material under the deck of a ship.

A further object is to provide trimming apparatus which can be easily operated and manipulated.

With these and other objects in view, the invention consists in certain novel features of construction and combinations of parts as hereinafter set forth and pointed out in the claims.

In the accompanying drawings; Figure 1 is a view in elevation (a portion of a ship being shown in section) illustrating an embodiment of my invention; Fig. 2 is a plan view, partly in section, on the line 2—2 of Fig. 1; Fig. 3 is an end view, partly in section; Fig. 4 is a view in plan of the turntable and hopper and frame carrying these parts. Fig. 5 is a view in plan of the runway for the turn-table, and Fig. 6 is a view in transverse vertical section of the conveyer.

1 represents a portion of a ship having a hatchway 2 surrounded by combing 3.

Beams 4 are mounted over the hatchway and provided with rollers to run on the edges of the combing 3, and the ends of these beams may be connected by cross bars 5. The trimming apparatus is supported on the beams 4 as hereinafter explained and screws 6 carried by rollers, shown in Figs. 1 and 3, and engaging the beams may be provided for raising and lowering said beams to adjust the apparatus for different ships, the screws passing through brackets 4ª on the beams and having nuts 4ᵇ above and below the brackets for adjusting and holding the beams in position. Gearing 7 fixed to a roller shaft carrying the beams 4, and operable by a winch 8 carrying a pinion meshing with said gearing is provided for propelling the cross-beam frame along the combing of the hatchway.

A truck 9 is mounted on grooved rollers which travel on the upper surfaces of the beams or beam-frame 4 and may be propelled by gearing 10 connected to one of its wheel axles and operable by a winch 11. Upon the truck 9, a circular base 12 for a turntable 13, is mounted,—said base having a groove or runway 14 for anti-friction balls 15 upon which said turntable is directly mounted, and the latter may be grooved for the accommodation of said balls. A drum 16 is mounted on the base 12 and a cable 17 which passes around the turntable, is connected with this drum. Gearing 18 is also connected with the drum 16 and is operable by a winch 19 for the purpose of turning the turntable.

A hopper 20 is secured to and depends from the turntable, the upper portion of said hopper being circular to conform to the shape of the turntable and its lower portion being contracted and made angular as indicated at 21. This hopper depends through the hatchway of the ship and discharges upon a conveyer or distributer 22 located under the deck of the ship. The frame of the conveyer or distributer 22 is made rectangular in shape having a closed bottom floor 23, sides 24 and a sub-floor 25. Sprocket wheels 26 are mounted near respective ends of the frame for the accommodation of sprocket chains 27 connected by cross rods 28 carrying flights 29,—the arrangement being such that the flights of the conveyer will move forwardly over the upper or sub-floor and return between the two floors of the frame. The ends of the rods 28 may be provided with guides 30 movable through guideways 31 on the sides of the conveyer frame. The conveyer or distributer may be driven through the medium of gearing 32—33 from an electric motor 34 mounted on the conveyer frame,— electric current being supplied to said motor by a flexible cable 35 from any convenient source of supply.

The frame of the conveyer is pivotally connected an appreciable distance from its rear end, with the lower end of the hopper 20, by means of a rod 36 and the rear end of the conveyer frame is connected by a cable 37 with a drum 38 mounted on the hopper. Gearing 39 is connected with said drum and is operable by a winch 40 to tilt the conveyer on its pivotal connection with the hopper.

The trimming apparatus may be placed in position and assembled by suitable hoisting mechanism on the dock and it may also be removed from the ship with the use of such hoisting mechanism.

It is apparent that by operating the turntable, the conveyer or distributer may be swung in a horizontal plane so that it may be adjusted to distribute the material throughout different parts of the ship, and that by operating the drum 38, said conveyer may be tilted. It will also be seen that the conveyer may be moved laterally by moving the beam-frame 4 along the combing of the hatchway and that it may be adjusted longitudinally by running the truck 9 along the beam-frame 4.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. Trimming mechanism comprising a hopper, a conveyer pivotally connected thereto, a motor on the conveyer, means for tilting the conveyer, means for shifting it laterally, means for moving it longitudinally and means for swinging it in a horizontal plane.

2. Trimming mechanism comprising parallel beams, means for mounting said beams upon and moving the same along the combing of a hatchway, a hopper supported by said beams, a conveyer secured to the hopper, and means for turning the hopper to swing the conveyer in a horizontal plane.

3. Trimming mechanism, comprising a turntable, means for mounting the same for movement over a hatchway whereby the turntable can be moved over the latter, a hopper depending from said turntable, a conveyer attached to the hopper, and means for operating the turntable to turn the hopper and swing the conveyer in a horizontal plane.

4. Trimming mechanism, comprising cross beams adapted to be mounted on the combing of a hatchway, a hopper supported by said cross beams, a conveyer attached to said hopper, and means for adjusting said cross beams vertically.

5. Trimming mechanism, comprising cross beams adapted to be mounted over a hatchway, means for adjusting said cross-beams vertically for lowering or elevating the hopper and conveyer, a truck mounted to travel on said beams, a turntable mounted on said truck, a hopper secured to the turntable and depending therefrom, and a conveyer supported by said hopper.

6. Trimming mechanism, comprising beams adapted to be removably mounted over a hatchway, means for moving said beams along the combing of the hatchway, a truck mounted on said beams, means for moving the truck, a turntable mounted on the truck, means for turning the turntable, a hopper secured to the turntable, a conveyer having its frame pivoted to the hopper and projecting laterally therefrom, means for tilting the conveyer, and means for operating the conveyer.

In testimony whereof, I have signed this specification in the presence of two subscribing witnesses.

GEORGE H. HULETT.

Witnesses:
  A. N. OTIS,
  DUNCAN MILLS.